US008751632B2

(12) United States Patent
Poblete et al.

(10) Patent No.: US 8,751,632 B2
(45) Date of Patent: Jun. 10, 2014

(54) METHODS FOR WEB SITE ANALYSIS

(75) Inventors: Barbara Poblete, Santiago (CL); Ricardo Baeza-Yates, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 1045 days.

(21) Appl. No.: 12/770,665

(22) Filed: Apr. 29, 2010

(65) Prior Publication Data

US 2011/0270965 A1 Nov. 3, 2011

(51) Int. Cl.
*G06F 15/173* (2006.01)

(52) U.S. Cl.
USPC ............................ 709/224; 709/225; 709/226

(58) Field of Classification Search
None
See application file for complete search history.

(56) References Cited

U.S. PATENT DOCUMENTS

| | | | | |
|---|---|---|---|---|
| 8,090,679 B2 * | 1/2012 | Zhuge et al. | 707/603 |
| 2003/0131106 A1 * | 7/2003 | Kasriel | 709/225 |
| 2004/0130569 A1 * | 7/2004 | Thorpe | 345/733 |
| 2006/0075494 A1 * | 4/2006 | Bertman et al. | 726/22 |
| 2006/0137014 A1 * | 6/2006 | Hurst et al. | 726/25 |
| 2007/0143851 A1 * | 6/2007 | Nicodemus et al. | 726/25 |
| 2007/0157245 A1 * | 7/2007 | Collins | 725/46 |
| 2009/0265338 A1 * | 10/2009 | Kraft et al. | 707/5 |
| 2009/0327353 A1 * | 12/2009 | Zhuge et al. | 707/200 |

* cited by examiner

*Primary Examiner* — Umar Cheema
(74) *Attorney, Agent, or Firm* — Martine Penilla Group, LLP

(57) ABSTRACT

A specification of a target web site is received. A number of field web sites related to the target web site are identified. Data values are acquired for a set of metrics for the target and each field web site. These data values are processed to evaluate a standing of the target web site relative to the field web sites, while maintaining anonymity of the field web sites. An average web site is determined by respectively averaging data values for the field web sites. A bounding web site is characterized by the best data values from among all field web sites. Target web site data values are compared to average and/or bounding web site data values at a given time. Variations in differences between target web site data values and corresponding average and/or bounding web site data values over time determines improvement and/or success of the target web site.

22 Claims, 6 Drawing Sheets

METHODS FOR WEB SITE ANALYSIS

BACKGROUND OF THE INVENTION

In today's web (internet) universe, there can be fierce competition between web sites trying to reach persons of a given interest or market segment. The competing web sites struggle to differentiate themselves and attract online traffic so as to convey and spread their particular web content. Web sites can employ many different types of content and services, such as documents, related links, graphics, pictures, video, audio, e-commerce, applications of various function, among others. However, not all content is equally effective, and not all web sites have equal content. Therefore, a continuing challenge for a given web site is to understand how effective its current content is with regarding to reaching and interacting with its target online user segment.

SUMMARY OF THE INVENTION

In one embodiment, a computer implemented method for web site analysis is disclosed. The method includes an operation for receiving a specification of a target web site. The method also includes an operation for identifying a number of field web sites related to the target web site. The method further includes an operation for acquiring data values for a set of metrics for the target web site and for each field web site at a first time. Also, the method includes processing the acquired data values for the set of metrics to evaluate a standing of the target web site relative to the field web sites at the first time.

In another embodiment, a computer implemented method is disclosed for characterizing an average web site relevant to a target web site. In the method, a specification of the target web site is received, and a number of field web sites related to the target web site are identified. The method continues with acquiring data values for a set of metrics for each field web site. For each metric within the set of metrics, the data values acquired for the metric from among all field web sites are averaged to generate an average data value for the metric. The average data values for the set of metrics characterize the average web site. The method further includes generating a report to convey the average data values for the set of metrics that characterize the average web site.

In another embodiment, a computer implemented method is disclosed for characterizing a bounding web site relevant to a target web site. In the method, a specification of the target web site is received, and a number of field web sites related to the target web site are identified. The method continues with acquiring data values for a set of metrics for each field web site. For each metric within the set of metrics, a best data value acquired for the metric from among all field web sites is assigned as a bounding data value for the metric. The bounding data values for the set of metrics characterize the bounding web site. The method further includes generating a report to convey the bounding data values for the set of metrics that characterize the bounding web site.

In another embodiment, a computer implemented method for evaluating web site performance is disclosed. The method includes an operation for receiving a specification of a target web site. The method also includes operations for acquiring data values for a set of metrics for the target web site at each of a first time and a second time, with the second time being later than the first time. For each metric within the set of metrics, the method includes an operation for comparing the data value for the metric at the second time with the data value for the metric at the first time, to determine whether or not the target web site has improved with regard to the metric between the first and second times. The method further includes an operation for generating a report to convey whether or not the target web site has improved between the first and second times with regard to each metric within the set of metrics.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

An online web site analysis tool is disclosed herein for generating a customized web site market study for a target web site, i.e., customer web site. The online web site analysis tool performs a number of computer implemented methods to automatically perform data mining techniques and analyses to facilitate identification of strengths and weaknesses in the target web site, relative to other web sites within a field of the target web site. Comparison of the target web site with other web sites in its field is made based on similarities and differences found within the content and search engine queries of all web sited considered. Based on the market study, the online web site analysis tool can provide information on how the target web site can improve within its field of web sites. Also, the online web site analysis tool is capable of performing analysis of the target web site on an incremental basis to enable measurement of the progress of the target web site within its field of web sites.

Figure 1A:
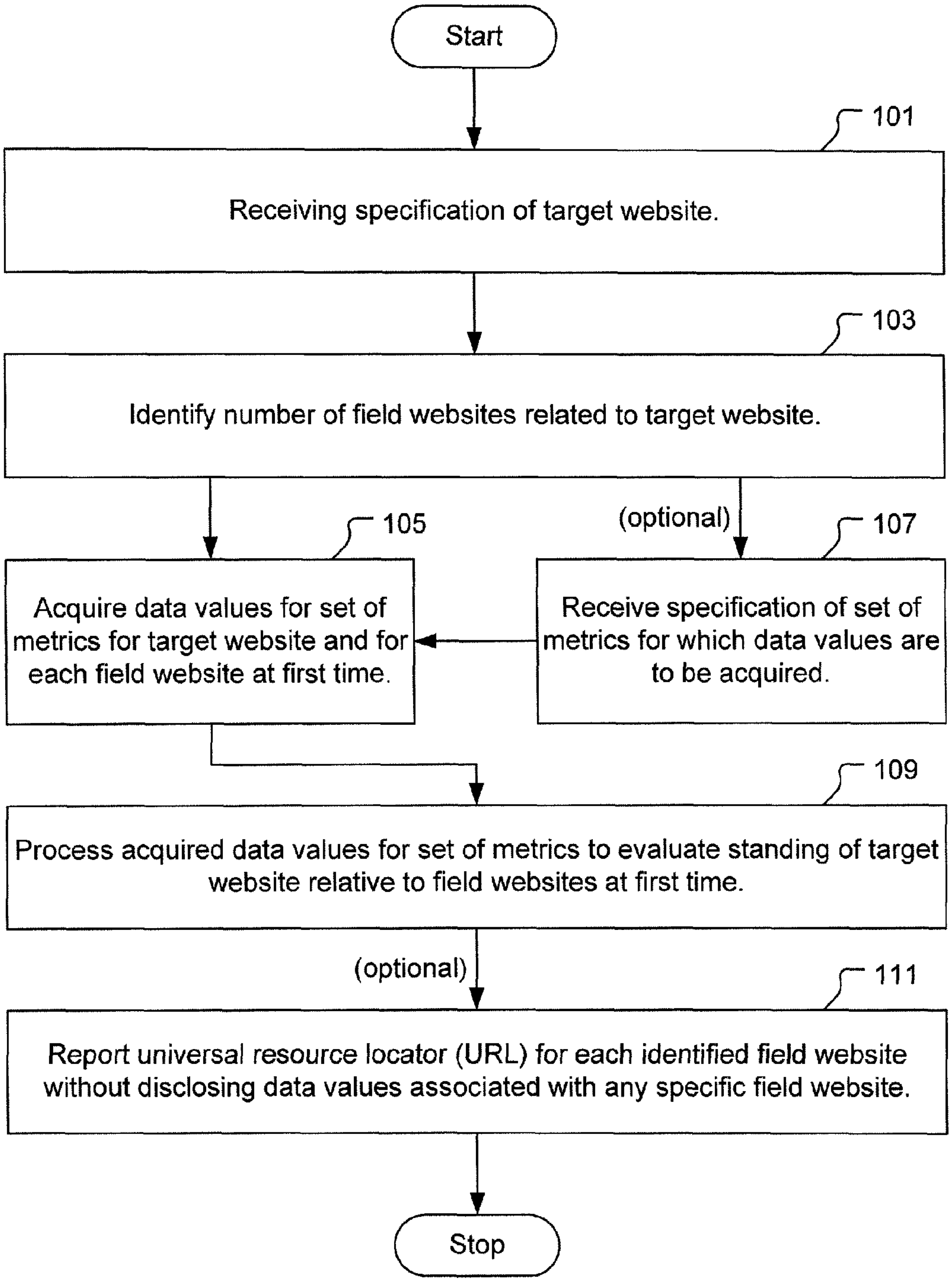
FIG. 1A shows a flowchart of a computer implemented method for web site analysis, in accordance with one embodiment of the present invention.

FIG. 1A shows a flowchart of a computer implemented method for web site analysis, in accordance with one embodiment of the present invention. The method includes an operation 101 for receiving a specification of a target web site. The target web site is a web site for which the market study is to be performed by the online web site analysis tool. It should be understood that the specification of the target web site is an identifier of the target web site, such as its universal resource locator (URL). The method proceeds with an operation 103 for identifying a number of field web sites related to the target web site. The field web sites represent a market of the target web site. In other words, the field web sites are those web sites that represent the most direct competition of the target web site with regard to attracting online traffic and interacting with online users.

It should be appreciated that the field web sites are automatically identified by the online web site analysis tool. In one embodiment, the field web sites related to the target web site are automatically identified based on comparison of a content of the target web site to a content of potential field web sites. The online web site analysis tool can utilize a search engine to search and find a number of field web sites that have content similar to that of the target site.

In one embodiment, a user of the online web site analysis tool, such as an owner of the target web site, can identify a set of competitor web sites to be included in the field web sites. In this embodiment, the set of competitor web sites provided by the target web site owner can be used as a “seed set of web sites” from which the automatic identification of field web sites begins. When starting with the seed set of web sites and the target web site, the field web sites can be found by examining the search engine query log, e.g., Yahoo! query log, to determine which other web sites have been clicked on from the same queries in which any of the seed set of web sites and/or target web site have been clicked on. These other web sites that have been clicked on from the same queries are added to the set of field web sites related to the target web site. If there is no seed set of web sites provided, the field web sites can be found by examining the search engine query log to determine which other web sites have been clicked on from the same queries in which the target web site has been clicked on. These other web sites that have been clicked on from the same queries are added to the set of field web sites related to the target web site. The above process can be repeated as many times as necessary until a desired number of field web sites have been identified.

Additionally, the identified field web sites can be validated by the online web site analysis tool before using them in the market study for the target web site. In one embodiment, a field web site is validated by clustering its contents and verifying that some degree of correlation exists between the content of the target web site and the content of the field web site. The validation clustering can be applied to web site documents, in which the text of the documents is used to automatically produce groups of topics. The topics within the target web site can be automatically compared to topics within the field web site to determine whether a sufficient correlation exists among the topics to include the field web site in the market study for the target web site.

The method proceeds with an operation 105 for acquiring data values for a set of metrics for the target web site and for each field web site at a first time. The data values for the set of metrics for the target web site and for each field web site are acquired from public web site data. In one embodiment, the public web site data includes search engine data. Also, in one embodiment, some of the data values for the set of metrics for the target web site are acquired from private target web site data. For example, the private target web site data can include a usage log of the target web site supplied by the owner of the target web site.

Additionally, in one embodiment, the method can include an optional operation 107 performed prior to operation 105, for receiving a specification of the set of metrics for which data values are to be acquired. In one embodiment, specification of the set of metrics can be provided by user selection of the desired metrics from a listing displayed by the online web site analysis tool. In other embodiments, the set of metrics can be conveyed by the user to the online website analysis tool in essentially any format and by essentially any means that is mutually understood by both the user and the online website analysis tool. It should be understood, that in lieu of the optional operation 107, the method can proceed directly from operation 103 to operation 105 by using a default set of metrics registered with the online web site analysis tool.

From the operation 105, the method proceeds with an operation 109 for processing the acquired data values for the set of metrics to evaluate a standing of the target web site relative to the field web sites at the first time. Processing of the acquired data values for the set of metrics can include comparison of the target web site’s data values for various metrics to average or bounding field web site data values for the corresponding metrics. It should be understood that the processing of the acquired data values for the set of metrics is performed without disclosing data values associated with any specific field web site. Therefore, each field web site retains its anonymity with regard to its specific data values for the set of metrics. In one embodiment, the method includes an optional operation 111 for reporting a URL for each identified field web site without disclosing data values associated with any specific field web site. Also, it is of interest to ensure that the field web site includes a sufficient number of web sites such that disclosure of processed data values, such as average or bounding data values, cannot be reliably attributed to any particular field web site.

Data values for the set of metrics for the field web sites and target web site can be extracted from private and/or public information, such as search engine results including a given web site of interest. Search engines, such as Yahoo!, tracks and stores “web site available data” for each web site that is encountered by the search engine. For example, Yahoo! search engine web site data is based on clicks made to a particular web site from the Yahoo! search engine. Search engine queries are obtained from the search engine query log, e.g., the Yahoo! search engine query log, or from the access logs of the target web site. The query log of a given search engine includes information about search engine queries that reached all field web sites from the given search engine. The access logs of the target web site includes information about queries from all search engines to the target web site. It should be understood that the search engine query log is owned by the search engine provider, and therefore represents private information. Also, the access logs of the target web site are privately owned and represent private information. The online web site analysis tool is defined to prevent disclosure of private information used in its analysis, such that explicit private information about a given field web site cannot be attributed to the given field web site by a third party.

The online web site analysis tool processes web site metric data that is already stored for a population of web sites as a result of search engine operations. For example, in one embodiment, the data inputs of the online web site analysis tool are the Yahoo! search logs, which provide usage information about each web site within a population of web sites that are accessible through the Yahoo! search engine. The online web site analysis tool is defined to perform data mining operations on the search engine usage logs to find/identify the field web sites associated with the target web site. Also, it should be understood that the links and contents of potential field web sites are taken into consideration when performing a comparative analysis with the target web site to identify field web sites to be used in the data analysis. Data values for the set of metrics for the field web sites can also be obtained from other publicly available information/sources in the web, such a from public ad placement keyword suggestion tools for search engines, by way of example.

Data values for the set of metrics for the target web site can also be extracted from private information about the target web site, such as from usage/access logs provided by the target web site owner. In one embodiment, the target web site usage log registers visits, queries from search engines, and user behavior on the target web site. In one embodiment, the user of the online web site analysis tool, who is presumed to be the owner of the target web site, can upload the target web site usage/access log to the online web site analysis tool. In another embodiment, a script or other type of program can be run on the target web site, with the user's permission, to facilitate transmission of target web site data to the online web site analysis tool.

The listing below describes a number of example data items that can be tracked by a search engine, such as the Yahoo! search engine, and made available to the online web site analysis tool. The example listing below also includes some publicly available web site data. The set of web site metrics to be considered in the web site market study can be derived from data items, such as those listed below. It should also be noted that the operations Rank, URL, Freq, $Q^+$, and $Q_{Y!}$, as listed below, can support a filter by Session, to get only the results from a particular session. The example listing of data items below uses the following notation:

Y!=Yahoo search engine
G=Advertisement Keyword Tool
S=Target web site
X=Any web site, including S Example Web Site Data Items Available to Online Web Site Analysis Tool Snapshot(X): Snapshot of web site X
Inlinks(X): In-links to web site X
Outlinks(X): Out-links of web site X
Traffic(S): Traffic for web site S
$Traffic_{Y!}(X)$: Traffic for web site X on Y!
$Q^+(S)$: All queries for web site S, from any S.E. (search engine)
$Q_{Y!}(X)$: All queries from Y! to web site X
$Keywords_G(X)$: Keyword suggestions from Advertisement Keyword Tool for web site X
Rank (q,X): Rank of web site X for a query q in $Q^+(S)$ for all S.E.
Rank(k,X): Rank of web site X for keyword k in $Keywords_G(X)$ for all S.E.
Results (q,X): Results shown for q in $Q^+(S)$ of web site X for all S.E.
Results(k,X): Results shown for keyword k in $Keywords_G(X)$ of web site X for all S.E.
URL(q,S): URLs from S visited by users for q in $Q^+(S)$ for all S.E.
URL(q,X): URLs from web site X visited by users from q in $Q_{Y!}(X)$ from Y!
Freq(u,S): Frequency in which URL u in $URL(Q^+(S),S)$ was visited for all S.E.
Freq(u,X): Frequency in which URL u in $URL(Q_{Y!}(X),X)$ was visited from Y!

The following listing describes a number of example web site metrics that can be considered in performing any of the computer implemented methods for web site analysis disclosed herein. The web site metrics are computed by the online web site analysis tool using the available web site data, such as the example web site data items listed above.

Example Web Site Metrics

- Number of web site pages reached from search engine, including:
  - Query coverage in-general (number of unique terms or queries from search engine).
  - Query coverage of documents in the web site (number of documents reached by search engine queries in the web site).
  - Number of visits to the web site from queries.
  - Fraction of visits to the web site relative to all visits to all web sites in the same field.
- Number of viewed web site pages per session.
- Time spent by visitors on web site (or stickiness).
- Rank of web site on search engine
- Number of unique visits to web site
- Number of visits to important pages of the web site (coverage)
- Number of in-links in web site
- Out-link quality of web site (recursive)
- Component position of web site in web (e.g., in a well-connected component of the web such as Main).
- URL-Query graph ranking of web site
- Topical grouping of documents (i.e., good labels, association among similar documents by links, etc.)

In addition to web site metrics that are pre-defined for computation by the online web site analysis tool, an option can also be provided for the user to specify one or more custom web site metrics to be computed by the online web site analysis tool. The custom web site metrics should be computable from the available web site data and/or existing/previously-defined web site metrics. In one embodiment, the online website analysis tool exposes a web site data nomenclature to the user that can be utilized to define custom web site metrics which will be understood by the online web site analysis tool.

Figure 1B:
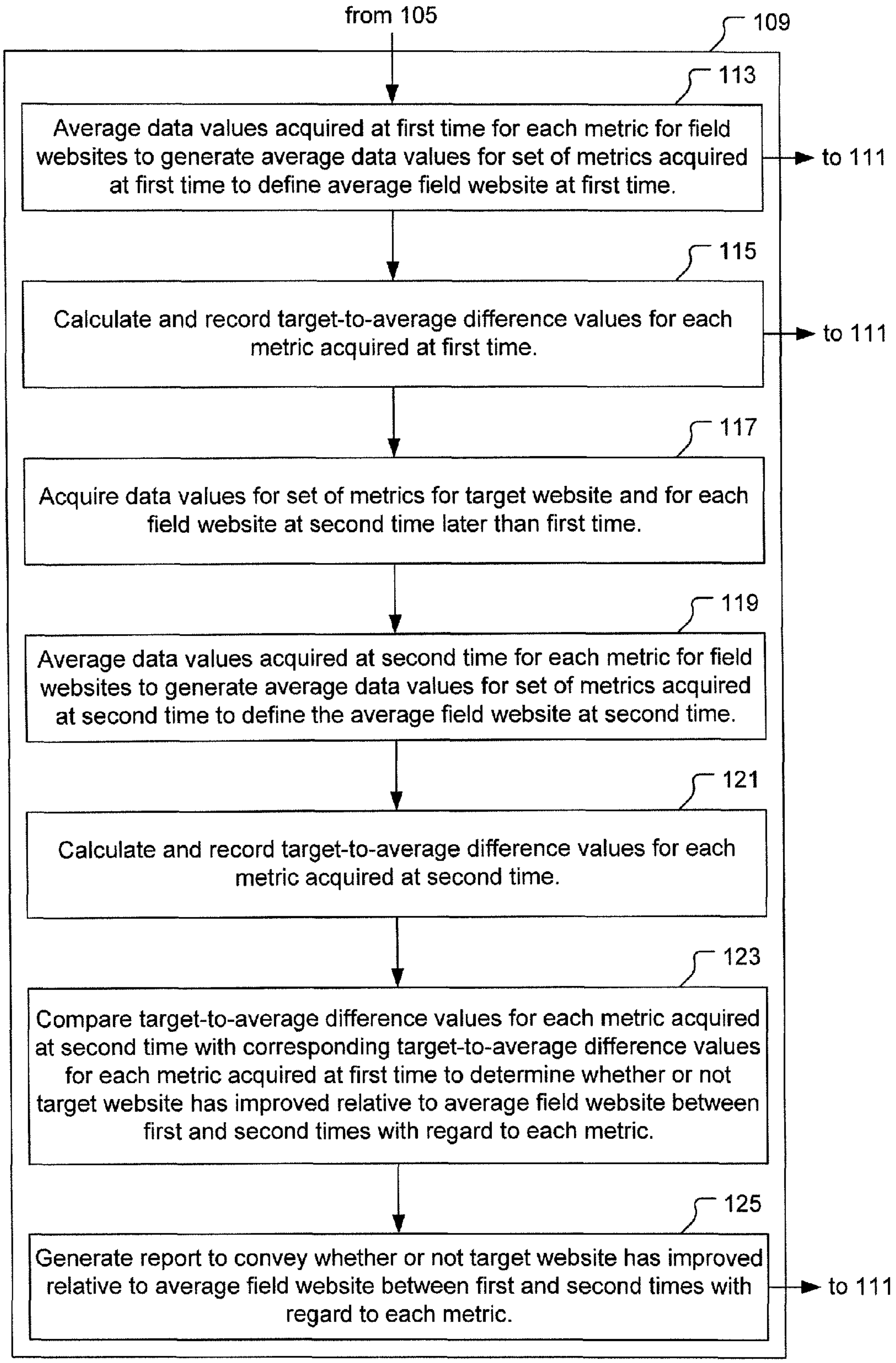
FIG. 1B shows a flowchart expansion of operation 109 of FIG. 1A for processing the acquired data values, in accordance with one embodiment of the present invention.

FIG. 1B shows a flowchart expansion of operation 109 of FIG. 1A for processing the acquired data values, in accordance with one embodiment of the present invention. From operation 105, an operation 113 is performed for averaging the data values acquired at the first time for each metric within the set of metrics for the field web sites to generate average data values for the set of metrics acquired at the first time. The average data values for the set of metrics acquired at the first time define an average field web site at the first time. It should be understood that the set of metrics for the target web site are not included in the computation of the average field web site metrics. From the operation 113, the method can either proceed with optional operation 111, conclude, or proceed with an operation 115 for calculating and recording target-to-average difference values for each metric within the set of metrics at the first time. The target-to-average difference value for a given metric at a particular time is defined as a difference between the data value for the given metric for the target web site and the average value for the given metric for the average field web site at the particular time. From the operation 115, the method can either proceed with optional operation 111, conclude, or proceed with an operation 117.

Operation 117 is performed to acquire data values for the set of metrics for the target web site and for each field web site at a second time later than the first time. Following operation 117, an operation 119 is performed to average the data values acquired at the second time for each metric within the set of metrics for the field web sites to generate average data values for the set of metrics acquired at the second time. The average data values for the set of metrics acquired at the second time define the average field web site at the second time. The method proceeds with an operation 121 for calculating and recording target-to-average difference values for each metric within the set of metrics at the second time.

An operation 123 is then performed to compare the target-to-average difference values for each metric within the set of metrics at the second time with corresponding target-to-average difference values for each metric within the set of metrics at the first time, to determine whether or not the target web site has improved relative to the average field web site between the first and second times with regard to each metric within the set of metrics. Additionally, the method includes an operation 125 for generating a report to convey whether or not the target web site has improved relative to the average field web site between the first and second times with regard to each metric within the set of metrics.

In one embodiment, the report will detail the respective data values for set of evaluated metrics for the target web site and the average field web site at the first and second times and show the differences therebetween. It should be appreciated that because the specific data values for set of evaluated metrics for the field web sites are abstracted in the form of the average data values, the anonymity of specific field web site data is preserved. Therefore, the method provides for analytical comparison of the target web site to its relevant field web sites without disclosing specific data of any particular field web site. In one embodiment, the URLs of the field web sites may be disclosed to provide a characterization of the field.

Figure 1C:
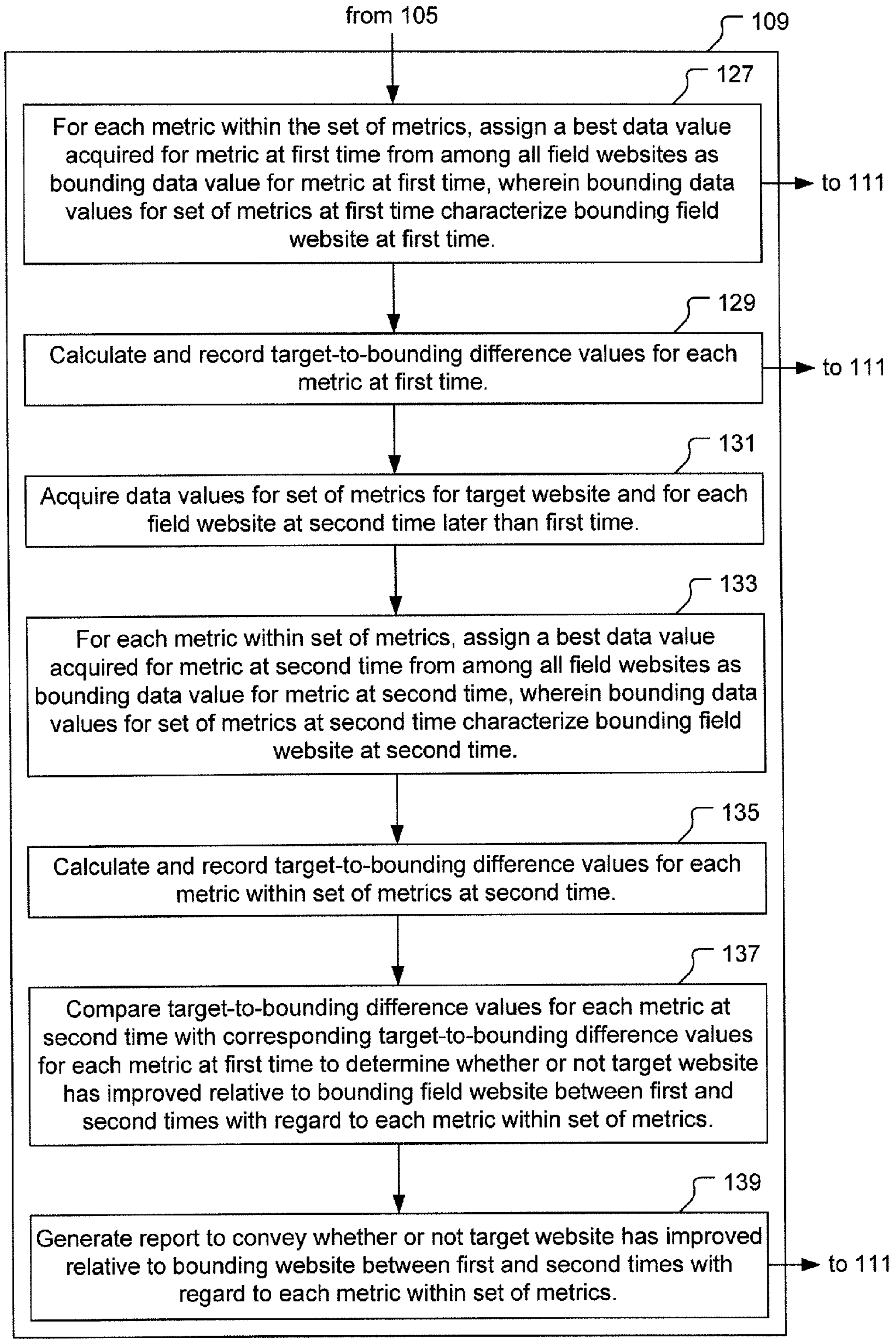
FIG. 1C shows a flowchart expansion of operation 109 of FIG. 1A for processing the acquired data values, in accordance with another embodiment of the present invention.

FIG. 1C shows a flowchart expansion of operation 109 of FIG. 1A for processing the acquired data values, in accordance with another embodiment of the present invention. From operation 105, an operation 127 is performed for assigning a best data value acquired for a given metric at the first time from among all field web sites as a bounding data value for the given metric at the first time. Operation 127 is performed for each metric within the set of metrics. It should be understood that the "best" data value acquired for a given metric is the data value for the given metric that correlates to the best web site performance with regard to the given metric. The bounding data values for the set of metrics at the first time characterize a bounding field web site at the first time. It should be understood that the set of metrics for the target web site are not included in determining the bounding field web site metrics.

From the operation 127, the method can either proceed with optional operation 111, conclude, or proceed with an operation 129 for calculating and recording target-to-bounding difference values for each metric within the set of metrics at the first time. The target-to-bounding difference value for a given metric at a particular time is defined as a difference between the data value for the given metric for the target web site and the corresponding bounding data value for the given metric for the bounding field web site at the particular time. It should be appreciated that comparison of the target web site metric data values to the bounding field web site metric data values enables identification of strengths and weaknesses of the target web site with regard to each metric. From the operation 129, the method can either proceed with optional operation 111, conclude, or proceed with an operation 131.

Operation 131 is performed to acquire data values for the set of metrics for the target web site and for each field web site at a second time later than the first time. Following operation 131, an operation 133 is performed to assign a best data value acquired for a given metric at the second time from among all field web sites as a bounding data value for the given metric at the second time. Operation 133 is performed for each metric within the set of metrics. The bounding data values for the set of metrics acquired at the second time characterize the bounding field web site at the second time. The method proceeds with an operation 135 for calculating and recording target-to-bounding difference values for each metric within the set of metrics at the second time.

An operation 137 is then performed to compare the target-to-bounding difference values for each metric within the set of metrics at the second time with corresponding target-to-bounding difference values for each metric within the set of metrics at the first time, to determine whether or not the target web site has improved relative to the bounding field web site between the first and second times with regard to each metric within the set of metrics. Additionally, the method includes an operation 139 for generating a report to convey whether or not the target web site has improved relative to the bounding web site between the first and second times with regard to each metric within the set of metrics.

In one embodiment, the report will detail the respective data values for set of evaluated metrics for the target web site and the bounding field web site at the first and second times and show the differences therebetween. It should be appreciated that because the specific data values for set of evaluated metrics for the field web sites are abstracted in the form of the bounding data values, the anonymity of specific field web site data is preserved. Therefore, the method provides for analytical comparison of the target web site to its relevant field web sites without disclosing specific data of any particular field web site. In one embodiment, the URLs of the field web sites may be disclosed to provide a characterization of the field. In one embodiment, if the target web site improves its metric data values relative to both the average and bounding field web sites between the first and second times, the target web site is classified as "successful."

Figure 2:
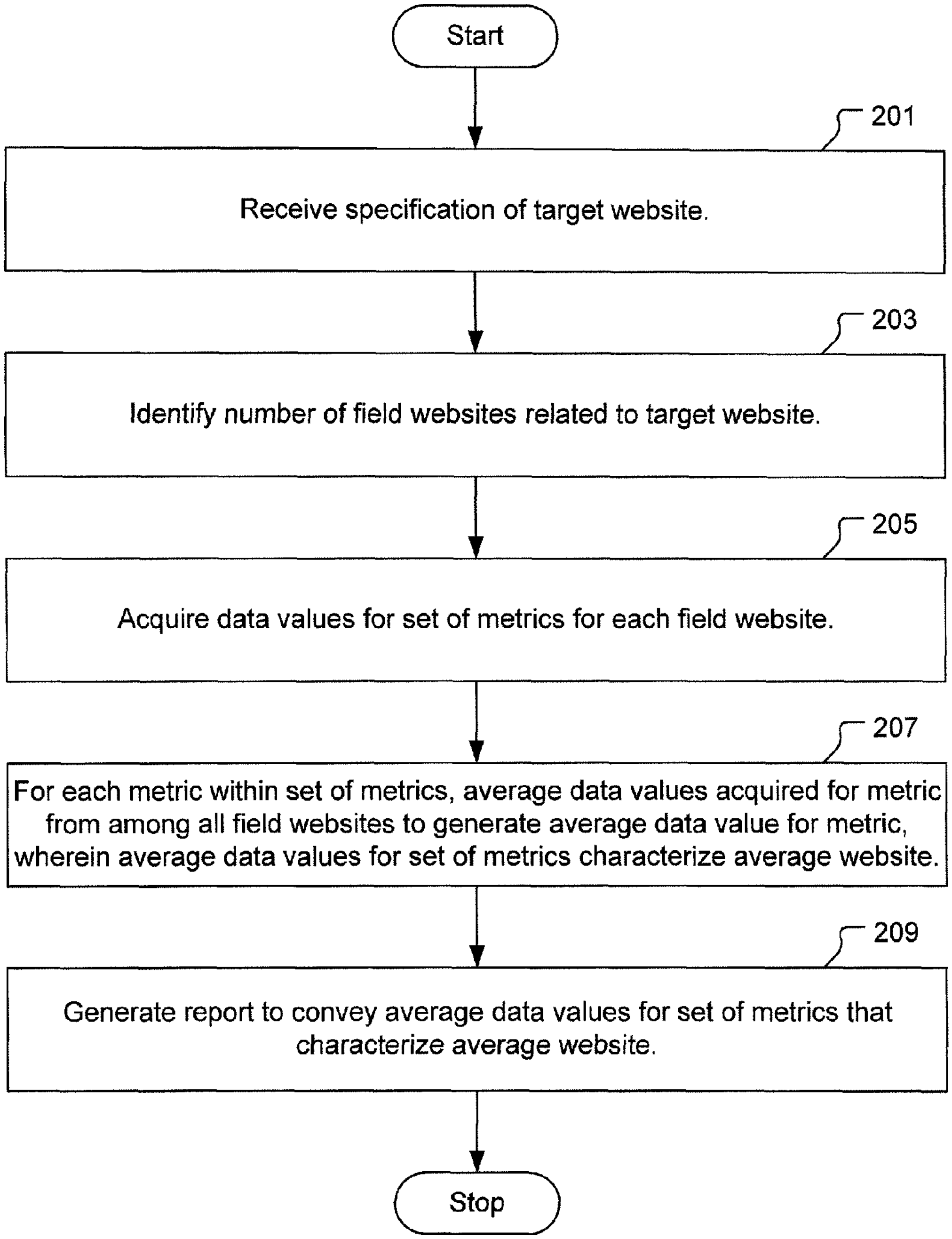
FIG. 2 shows a flowchart of a computer implemented method for characterizing an average web site relevant to a target web site, in accordance with one embodiment of the present invention.

FIG. 2 shows a flowchart of a computer implemented method for characterizing an average web site relevant to a target web site, in accordance with one embodiment of the present invention. An operation 201 is performed to receive a specification of the target web site. An operation 203 is performed to identify a number of field web sites related to the target web site. In one embodiment, the field web sites related to the target web site are automatically identified based on comparison of a content of the target web site to a content of potential field web sites. It should be understood that operations 201 and 203 entail the same considerations as operations 101 and 103 of FIG. 1A.

The method then proceeds with an operation 205 for acquiring data values for a set of metrics for each field web site. The data values for the set of metrics for each field web site are acquired from public web site data. It should be understood that operation 205 entails the same considerations as operation 105 of FIG. 1A. An operation 207 is then performed to average the data values acquired for a given metric from among all field web sites to generate an average data value for the given metric. Operation 207 is performed for each metric within the set of metrics. The average data values for the set of metrics characterize the average web site. The method also includes an operation 209 for generating a report to convey the average data values for the set of metrics that characterize the average web site. Generation of the report is performed without disclosing an association of data values with any specific field web site.

Figure 3:
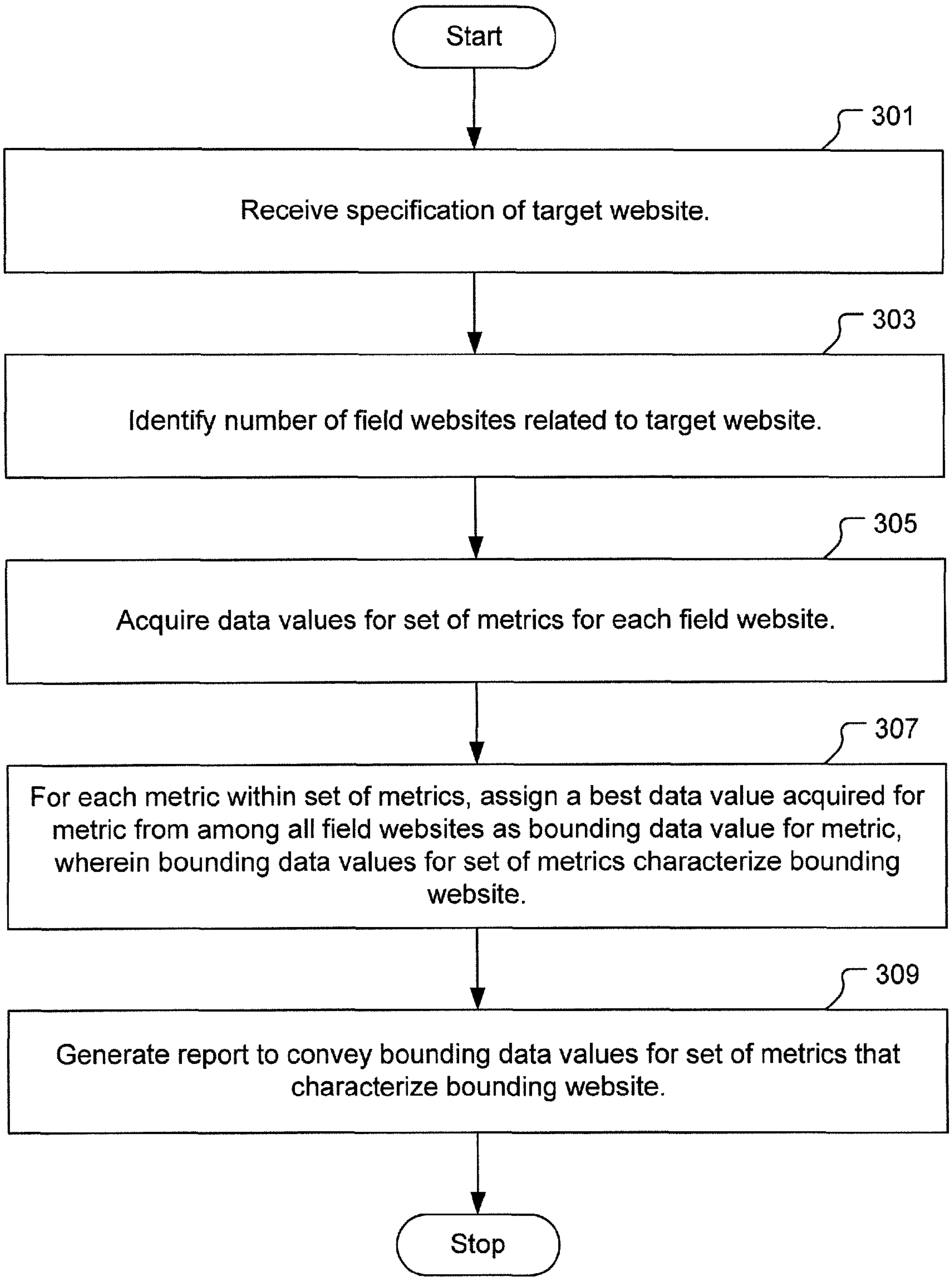
FIG. 3 shows a flowchart of a computer implemented method for characterizing a bounding web site relevant to a target web site, in accordance with one embodiment of the present invention.

FIG. 3 shows a flowchart of a computer implemented method for characterizing a bounding web site relevant to a target web site, in accordance with one embodiment of the present invention. An operation 301 is performed to receive a specification of the target web site. An operation 303 is performed to identify a number of field web sites related to the target web site. In one embodiment, the field web sites related to the target web site are automatically identified based on comparison of a content of the target web site to a content of potential field web sites. It should be understood that operations 301 and 303 entail the same considerations as operations 101 and 103 of FIG. 1A.

The method then proceeds with an operation 305 for acquiring data values for a set of metrics for each field web site. The data values for the set of metrics for each field web site are acquired from public web site data. It should be understood that operation 305 entails the same considerations as operation 105 of FIG. 1A. An operation 307 is then performed to assign a best data value acquired for a given metric from among all field web sites as a bounding data value for the given metric. Operation 307 is performed for each metric within the set of metrics. The bounding data values for the set of metrics characterize the bounding field web site. The method also includes an operation 309 for generating a report to convey the bounding data values for the set of metrics that characterize the bounding field web site. Generation of the report is performed without disclosing an association of data values with any specific field web site.

Figure 4:
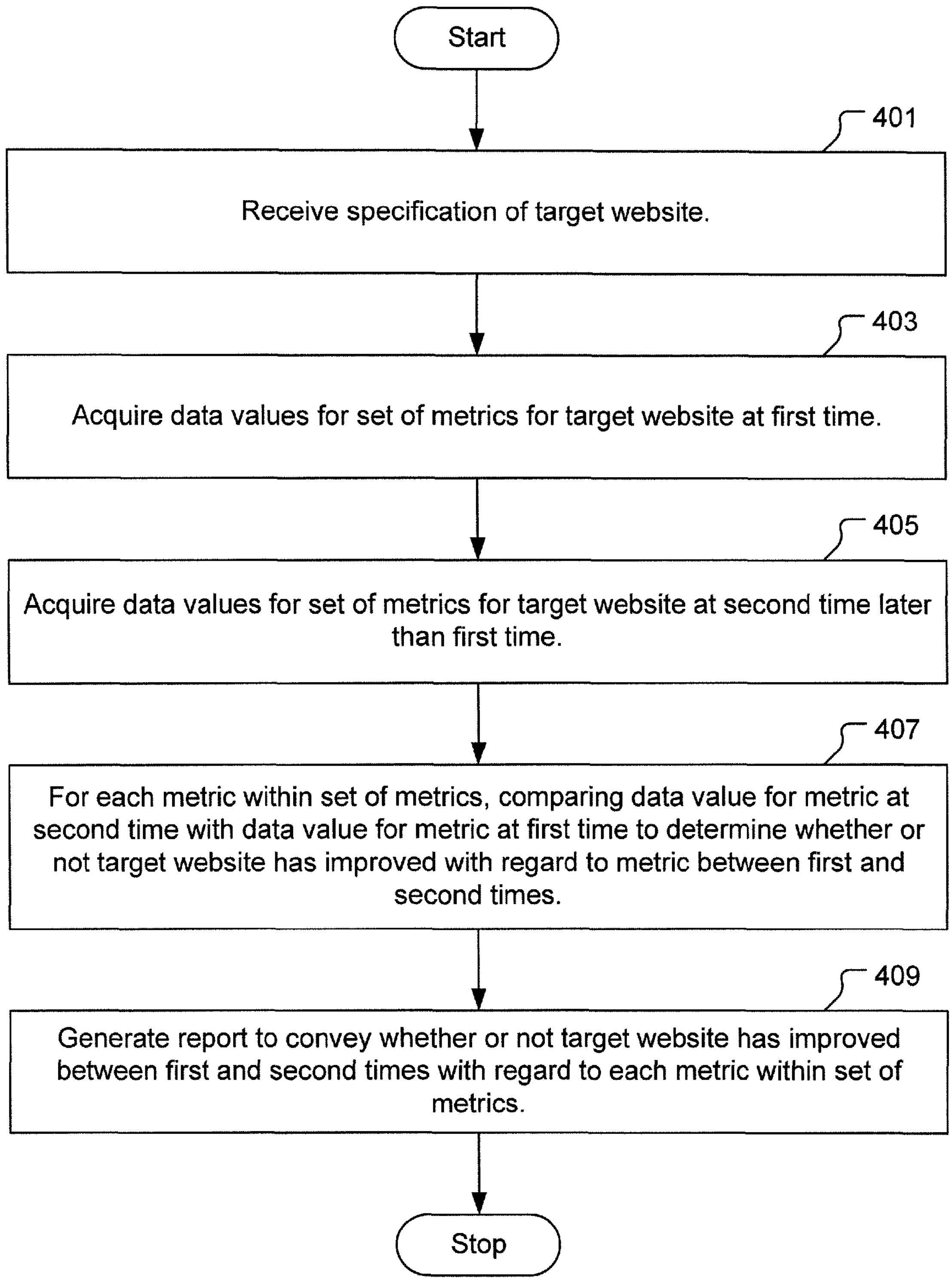
FIG. 4 shows a flowchart of a computer implemented method for evaluating web site performance, in accordance with one embodiment of the present invention.

FIG. 4 shows a flowchart of a computer implemented method for evaluating web site performance, in accordance with one embodiment of the present invention. The method includes an operation 401 for receiving a specification of a target web site. An operation 403 is performed to acquire data values for a set of metrics for the target web site at a first time. An operation 405 is also performed to acquire data values for the set of metrics for the target web site at a second time later than the first time. The method continues with an operation 407 to compare the data value for a given metric at the second time with the data value for the given metric at the first time to determine whether or not the target web site has improved with regard to the given metric between the first and second times. The operation 407 is performed for each metric within the set of metrics. The method also includes an operation 409 for generating a report to convey whether or not the target web site has improved between the first and second times with regard to each metric within the set of metrics. If the target web site is found to have improved its metrics over time, the target website is classified as "improved."

Based on the foregoing, it should be understood that there are several types of web sites to which the target web site can be compared in performing a differential analysis of the target web site. In one embodiment, the target web site can be compared to itself at different times to evaluate improvement of the target web site. In another embodiment, the target web site can be compared the bounding field web site to evaluate success of the target web site. As discussed above, the bounding field web site is modeled from the upper-bound of the aggregation of field web sites that are similar to the target web site. In another embodiment, the target web site can be compared to the average field web site to evaluate success of the target web site. As discussed above, the average field web site is modeled from the average of the aggregation of field web sites that are similar to the target web site.

The differential analysis of the target web site relative to other web sites in its field can be perfoiined based on web site content and/or web site usage. The differential analysis of the target web site can include determining what content the target web site is lacking in comparison to the bounding field web site. The differential analysis of the target web site can include determining what content the target web site has that the average field web site does not have, and identifying such content as an advertising strength of the target web site. Content topics can be established in numerous ways. For example, content topics can be established by using clustering techniques, such as document view clustering, query view clustering, user view clustering (i.e., who views what), and/or content topic segmentation.

The clustering techniques performed by the online web site analysis tool can be applied to web site documents, in which the text of the documents is used to automatically produce groups of topics. The topics within the target web site can be automatically compared to topics within the field web sites to determine whether any correlations exist among the topics, e.g., to determine if the topics in the target web site are the same or different that the topics in the field web sites, or to determine if the target web site is lacking important content topics that are prevalent in the field web sites, etc. With regard to web site usage, the differential analysis of the target web site can include determination of which content topics of the target web site have less search engine traffic thereon relative to the average and/or bounding field web sites, and identification from where or who the search engine traffic is being lost on those lower traffic content topics.

The online web site analysis tool is further defined to perform an advertisement analysis of the target web site based on comparison of the target web site content and/or usage to that of the field web sites. The advertisement analysis of the target web site can include a related query analysis to suggest words for advertising based on related queries within the field web sites. Use of the suggested words for advertising obtained from the related query analysis may enable the target web site to grab its competitors web site positioning in search results. The advertisement analysis can also suggest advertisement positioning within the target web site based on frequency and productivity of related internal and/or external queries in the field web sites. Additionally, the advertisement analysis can include identification of non-successful queries in the search engine, which may be exploited by the target web site as generic publicity opportunities. Non-successful queries are those queries in the search engine from which competitor, i.e., field, web sites were clicked on in the search engine, with no click on the target web site.

The online web site analysis tool provides a service to web site owner's to improve their web site's competitive positioning on the web. More specifically, the analysis performed by the online web site analysis tool provides valuable information on how the target web site can improve its competitive position within its field of related web sites, and how to make the target web site more appealing to its users. The online web site analysis tool is defined to provide measurements of improvement and success of a target web site within its pertinent field of web sites, while preserving the anonymity of the field web sites with regard to their specific performance data.

The method to evaluate web site performance includes a method to measure a) "improvement", i.e. the target web site compared to itself at a previous time, and b) "success", which is directly proportional to the distance of the evaluated metrics of the target web site from the average field web site, in direction to the bounding field web site. In other words, a target web site is "successful" when it performs better than the average field web site and it becomes "more successful" as it progresses towards the metrics of the bounding field web site. The target web site can even outperform the bounding field web site, at some point.

The online web site analysis tool disclosed herein provides numerous services and advantages. For example, the online web site analysis tool can provide a SWOT (Strengths, Weaknesses, Opportunities, and Threats) analysis based on public and private field web site data. The online web site analysis tool can automatically generate a web market study of a particular field of web sites, and obtain strengths and weaknesses of a target web site within the particular field of web sites. The online web site analysis tool can also generate general benchmarks for web sites that are real and objective. In this regard, the online web site analysis tool can perform an auditing role as a neutral third party service. The online web site analysis tool can also provide a "rank" for web sites, which can be in relation to other similar sites. This ranking of web sites can be exposed for use as a search engine web site ranking resource. Additionally, the online web site analysis tool can provide advertisement recommendations for a target web site based on a related queries analysis of the target web site relative to its field web sites.

As mentioned above, the online web site analysis tool can identify "opportunities." For example, the online web site analysis tool can perform clustering of the content of web sites, which produces a grouping of documents into "topics." This can be done for the bounding field web site, the average field web site, and the target web site. If the target web site has topics that other web sites in the competition, i.e., field, do not have, then this can be identified as an opportunity in which the target web site can use this advantage for ad placement, marketing campaigns, etc., to better position itself in its field.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable storage medium. The computer readable storage medium may be any data storage device that can store data, which can thereafter be read by a computer system. Examples of the computer readable storage medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable code can also be distributed in portions among multiple computer readable media within a network coupled computer systems so that the computer readable code is stored, accessed, and/or executed in a distributed fashion.

Although the method operations of various embodiments disclosed herein were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overall operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for web site analysis, comprising:

receiving a specification of a target web site;

identifying a number of field web sites related to the target web site;

acquiring data values for a set of metrics for the target web site and for each field web site at a first time; and processing the acquired data values for the set of metrics to evaluate a standing of the target web site relative to the field web sites at the first time, wherein processing the acquired data values includes averaging the data values acquired at the first time for each metric within the set of metrics for the field web sites to generate average data values for the set of metrics acquired at the first time to define an average field web site at the first time.

2. A computer implemented method for web site analysis as recited in claim 1, wherein the processing of the acquired data values for the set of metrics is performed without disclosing an association of data values with any specific field web site.

3. A computer implemented method for web site analysis as recited in claim 1, further comprising:

reporting a universal resource locator (URL) for each identified field web site without disclosing an association of data values with any specific field web site.

4. A computer implemented method for web site analysis as recited in claim 1, wherein the data values for the set of metrics for the target web site and for each field web site are acquired from public web site data.

5. A computer implemented method for web site analysis as recited in claim 4, wherein the public web site data includes search engine data.

6. A computer implemented method for web site analysis as recited in claim 4, wherein some of the data values for the set of metrics for the target web site are acquired from private target web site data.

7. A computer implemented method for web site analysis as recited in claim 6, wherein the private target web site data includes a usage log of the target web site.

8. A computer implemented method for web site analysis as recited in claim 1, further comprising:

receiving a specification of the set of metrics for which data values are to be acquired.

9. A computer implemented method for web site analysis as recited in claim 1, wherein the field web sites related to the target web site are automatically identified based on comparison of a content of the target web site to a content of potential field web sites.

10. A computer implemented method for web site analysis as recited in claim 1, wherein processing the acquired data values further includes:

calculating and recording target-to-average difference values for each metric within the set of metrics at the first time, wherein the target-to-average difference value for a given metric at a particular time is defined as a difference between the data value for the given metric for the target web site and the average value for the given metric for the average field web site at the particular time.

11. A computer implemented method for web site analysis as recited in claim 10, wherein processing the acquired data values further includes:

acquiring data values for the set of metrics for the target web site and for each field web site at a second time later than the first time;

averaging the data values acquired at the second time for each metric within the set of metrics for the field web sites to generate average data values for the set of metrics acquired at the second time to define the average field web site at the second time;

calculating and recording target-to-average difference values for each metric within the set of metrics at the second time;

comparing the target-to-average difference values for each metric within the set of metrics at the second time with corresponding target-to-average difference values for each metric within the set of metrics at the first time to determine whether or not the target web site has improved relative to the average field web site between the first and second times with regard to each metric within the set of metrics; and generating a report to convey whether or not the target web site has improved relative to the average field web site between the first and second times with regard to each metric within the set of metrics.

12. A computer implemented method for web site analysis as recited in claim 1, wherein processing the acquired data values includes:

for each metric within the set of metrics, assigning a best data value acquired for the metric at the first time from among all field web sites as a bounding data value for the metric at the first time, wherein the bounding data values for the set of metrics at the first time characterize a bounding field web site at the first time.

13. A computer implemented method for web site analysis as recited in claim 12, wherein processing the acquired data values further includes:

calculating and recording target-to-bounding difference values for each metric within the set of metrics at the first time, wherein the target-to-bounding difference value for a given metric at a particular time is defined as a difference between the data value for the given metric for the target web site and the corresponding bounding data value for the given metric for the bounding field web site at the particular time.

14. A computer implemented method for web site analysis as recited in claim 13, wherein processing the acquired data values further includes:

acquiring data values for the set of metrics for the target web site and for each field web site at a second time later than the first time;

for each metric within the set of metrics, assigning a best data value acquired for the metric at the second time from among all field web sites as a bounding data value for the metric at the second time, wherein the bounding data values for the set of metrics at the second time characterize the bounding field web site at the second time;

calculating and recording target-to-bounding difference values for each metric within the set of metrics at the second time;

comparing the target-to-bounding difference values for each metric within the set of metrics at the second time with corresponding target-to-bounding difference values for each metric within the set of metrics at the first time to determine whether or not the target web site has improved relative to the bounding field web site between the first and second times with regard to each metric within the set of metrics; and generating a report to convey whether or not the target web site has improved relative to the bounding web site between the first and second times with regard to each metric within the set of metrics.

15. A computer implemented method for characterizing an average web site relevant to a target web site, comprising:

receiving a specification of the target web site;

identifying a number of field web sites related to the target web site;

acquiring data values for a set of metrics for each field web site;

for each metric within the set of metrics, averaging the data values acquired for the metric from among all field web sites to generate an average data value for the metric, wherein the average data values for the set of metrics characterize the average field web site; and generating a report to convey the average data values for the set of metrics that characterize the average field web site.

16. A computer implemented method for characterizing an average web site relevant to a target web site as recited in claim 15, wherein the generation of the report is performed without disclosing an association of data values with any specific field web site.

17. A computer implemented method for characterizing an average web site relevant to a target web site as recited in claim 15, wherein the data values for the set of metrics for each field web site are acquired from public web site data.

18. A computer implemented method for characterizing an average web site relevant to a target web site as recited in claim 15, wherein the field web sites related to the target web site are automatically identified based on comparison of a content of the target web site to a content of potential field web sites.

19. A computer implemented method for characterizing a bounding web site relevant to a target web site, comprising:

receiving a specification of the target web site;

identifying a number of field web sites related to the target web site;

acquiring data values for a set of metrics for each field web site;

for each metric within the set of metrics, assigning a best data value acquired for the metric from among all field web sites as a bounding data value for the metric, wherein the bounding data values for the set of metrics characterize the bounding field web site; and generating a report to convey the bounding data values for the set of metrics that characterize the bounding field web site.

20. A computer implemented method for characterizing a bounding web site relevant to a target web site as recited in claim 19, wherein the generation of the report is performed without disclosing an association of data values with any specific field web site.

21. A computer implemented method for characterizing a bounding web site relevant to a target web site as recited in claim 19, wherein the data values for the set of metrics for each field web site are acquired from public web site data.

22. A computer implemented method for characterizing a bounding web site relevant to a target web site as recited in claim 19, wherein the field web sites related to the target web site are automatically identified based on comparison of a content of the target web site to a content of potential field web sites.

* * * * *